(12) United States Patent
Jang

(10) Patent No.: US 9,293,287 B2
(45) Date of Patent: Mar. 22, 2016

(54) OVERCURRENT RELAY AND MOLDED CASE CIRCUIT BREAKER WITH THE SAME

(71) Applicant: LSIS CO., LTD., Anyang-si, Gyeonggi-do (KR)

(72) Inventor: Jun Yong Jang, Cheongju-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/455,627

(22) Filed: Aug. 8, 2014

(65) Prior Publication Data

US 2015/0130567 A1    May 14, 2015

(30) Foreign Application Priority Data

Nov. 11, 2013  (KR) .......................... 10-2013-0136453

(51) Int. Cl.
| | |
|---|---|
| *H01H 9/02* | (2006.01) |
| *H01H 71/02* | (2006.01) |
| *H01H 71/74* | (2006.01) |
| *H02H 3/093* | (2006.01) |
| *H01H 71/52* | (2006.01) |

(52) U.S. Cl.
CPC ............. *H01H 71/025* (2013.01); *H01H 71/74* (2013.01); *H02H 3/093* (2013.01); *H01H 71/02* (2013.01); *H01H 71/52* (2013.01)

(58) Field of Classification Search
CPC ....................................................... H01H 19/03
USPC ........................................... 335/202; 200/336
See application file for complete search history.

(56) References Cited

U.S. PATENT DOCUMENTS

| | | | | |
|---|---|---|---|---|
| 3,456,227 A | * | 7/1969 | Paine et al. | 338/164 |
| 3,831,120 A | * | 8/1974 | Powell et al. | 335/176 |
| 3,832,663 A | * | 8/1974 | Gelzheiser | 337/112 |
| 4,175,220 A | * | 11/1979 | Johnston et al. | 200/4 |
| 4,638,133 A | * | 1/1987 | Dvorak et al. | 200/302.1 |
| 5,467,069 A | * | 11/1995 | Payet-Burin et al. | 335/42 |
| 5,821,485 A | | 10/1998 | Singer et al. | |

(Continued)

FOREIGN PATENT DOCUMENTS

| | | |
|---|---|---|
| EP | 1841033 | 10/2007 |
| EP | 2463873 | 6/2012 |

(Continued)

OTHER PUBLICATIONS

Korean Intellectual Property Office Application Serial No. 10-2013-0136453, Notice of Allowance dated Mar. 23, 2015, 2 pages.

(Continued)

*Primary Examiner* — Alexander Talpalatski
(74) *Attorney, Agent, or Firm* — Lee, Hong, Degerman, Kang & Waimey

(57) ABSTRACT

An overcurrent relay and a molded case circuit breaker (MCCB) including the same are provided. The MCCB includes: a switching mechanism unit; an overcurrent relay; a trip mechanism, wherein the overcurrent relay includes: a case body; a case cover coupled to the case body; a control unit installed within the case body and having an electronic circuit board; and a plurality of setting knobs disposed to be spaced apart from one another on the electronic circuit board, having an indication unit exposed to the outside to indicate a current reference value and a trip operation time marked on the case cover, respectively, and configured to be rotatable, respectively.

6 Claims, 10 Drawing Sheets

(56) References Cited

U.S. PATENT DOCUMENTS

| | | | |
|---|---|---|---|
| 6,140,897 A * | 10/2000 | Mueller et al. | 335/172 |
| 6,255,925 B1 * | 7/2001 | DiMarco et al. | 335/176 |
| 6,351,232 B1 * | 2/2002 | Marie | 341/155 |
| 6,445,274 B1 * | 9/2002 | Malingowski et al. | 337/49 |
| 6,788,512 B2 * | 9/2004 | Vicente et al. | 361/93.1 |
| 7,301,742 B2 * | 11/2007 | Tignor et al. | 361/93.3 |
| 7,592,888 B2 * | 9/2009 | Colsch et al. | 335/176 |
| 8,717,126 B2 * | 5/2014 | Yamada et al. | 334/88 |
| 2005/0047045 A1 | 3/2005 | Puskar et al. | |
| 2005/0167255 A1 * | 8/2005 | Howie | 200/336 |
| 2008/0013238 A1 * | 1/2008 | Colsch et al. | 361/93.2 |

FOREIGN PATENT DOCUMENTS

| | | |
|---|---|---|
| JP | 53-69775 | 11/1976 |
| JP | 56-150921 | 11/1981 |
| JP | 07-141979 | 6/1995 |
| JP | 10-042452 | 2/1998 |
| JP | 2007-273159 | 10/2007 |
| JP | 2008-108452 | 5/2008 |
| KR | 20-2012-0001883 | 3/2012 |

OTHER PUBLICATIONS

European Patent Office Application Serial No. 14188757.0, Search Report dated Feb. 17, 2015, 5 pages.

Japan Patent Office Application Serial No. 2014-167303, Office Action dated Sep. 29, 2015, 8 pages.

* cited by examiner

OVERCURRENT RELAY AND MOLDED CASE CIRCUIT BREAKER WITH THE SAME

CROSS-REFERENCE TO RELATED APPLICATION

Pursuant to 35 U.S.C. §119(a), this application claims the benefit of earlier filing date and right of priority to Korean Patent Application No. 10-2013-0136453, filed on Nov. 11, 2013, the contents of which are hereby incorporated by reference herein in its entirety.

BACKGROUND OF THE INVENTION

1. Field of the Invention

The present disclosure relates to an overcurrent relay applied to a molded case circuit breaker, or the like.

2. Background of the Invention

In general, a protecting relay is a device that monitors a state of an electric power system, and when an accident occurs, the protecting relay detects the accident and operates a breaker to quickly separate an accident section to minimize a section affected by the accident.

Among protecting relays, an overcurrent relay is a protecting relay operating when an input current is equal to or greater than a pre-set value. Overcurrent relays have been used in various fields to protect devices and lines from an overload, a short-circuit, and grounding.

An overcurrent relay includes a plurality of setting knobs in an electronic circuit board to set a reference value with respect to a fault current and a trip operation time in the event of a fault current. The setting knobs include a setting knob for setting long-time limit reference values, a setting knob for setting short-time limit reference values, and a setting knob for setting instantaneous reference values.

The long-time limit reference values include a reference current value set to correspond to 80% to 100% of an allowable rated current and a trip operation time value set to range from 10 seconds to hundreds of seconds in case a current corresponding to the reference current value flows in a circuit. The short-time limit reference values include a reference current value that is approximately double of an allowable rated current and a trip operation time value to be within one second in case a current corresponding to the reference current value flows in a circuit. The instantaneous reference values include a reference current value set to be two-fold to tens of fold of a rated current in case an instantaneous current is very high due to a short-circuit of a load, a stroke of lightning, or the like, and a trip operation time value set to be generally within 50 milliseconds in case a current corresponding to the reference current value flows in a circuit.

In case of an overcurrent relay used as a trip device in a prior art MCCB, when a function is altered, a program and a PCB are modified to obtain an intended product.

FIG. 1 is a partially enlarged view illustrating a setting unit of an overcurrent relay in the prior art air circuit breaker (ACB), in which a plurality of setting knobs 41b are disposed to be spaced apart from one another in a setting unit 4b of the overcurrent relay. A setting knob 4b' is provided to set a long-time limit trip operation time in the event of an overcurrent. Here, a trip operation may be turned off by rotating the setting knob 4b' (a trip operation OFF position is indicated in the circle).

The ACB and the MCCB have a function of turning off an overcurrent trip operation in case of a long-time limit.

Here, overcurrent relays (OCRs) of the ACB and the MCCB have the trip operation conditions set using the same program. However, a trip operation OFF function of an MCCB in case of a long-time limit is against the application standards of Underwriters Laboratories Inc. (UL). In other words, an MCCB cannot use a program same as that of an ACB and should use a different program and PCB from those of an ACB.

SUMMARY OF THE INVENTION

Therefore, an aspect of the detailed description is to provide an overcurrent relay that has trip operation conditions set using a program and a PCB identical to those of an air circuit breaker (ACB) and satisfies UL standard conditions, and a molded case circuit breaker (MCCB) including the same.

To achieve these and other advantages and in accordance with the purpose of this specification, as embodied and broadly described herein, an overcurrent relay includes a case body, a case cover, an electronic circuit board, and a plurality of setting knobs.

The case cover includes a plurality of stop protrusions on an inner surface thereof and is coupled to the case body.

The electronic circuit board may be installed within the case body.

The plurality of setting knobs may be rotatably installed on the electronic circuit board, have a stoppage protrusion on a rotary plate, and be operated within a predetermined rotation range upon being caught by the stoppage protrusion, and set a trip operation time with respect to a fault current.

Any one of the plurality of setting knobs may be a dedicated knob in which a length of the stoppage protrusion in a circumferential direction is increased to have a rotation angle range narrower than those of the other setting knobs.

The dedicated knob may be used to set a long-time limit trip operation time, among a long-time limit trip operation time, a short-time limit trip operation time, and an instantaneous trip operation time.

Any one of the plurality of stop protrusions in the circumferential direction may extend to limit a rotation angle range of a setting knob corresponding to a particular stop protrusion such that the rotation angle range is narrower than those of other setting knobs.

To achieve these and other advantages and in accordance with the purpose of this specification, as embodied and broadly described herein, a molded case circuit breaker (MCCB) includes a switching mechanism unit, an overcurrent relay, and a trip mechanism module.

The switching mechanism unit may open and close a contact.

The overcurrent relay may detect fault current generated in a main circuit and output a trip command.

The trip mechanism module may be mechanically connected to the switching mechanism unit and generate operating force for a trip operation of the switching mechanism unit when the overcurrent relay outputs a trip command.

The overcurrent relay may include a case body, a case cover, a control unit, and a plurality of setting knobs.

The case cover may be coupled to the case body.

The control unit may be installed within the case body and have an electronic circuit board.

The plurality of setting knobs may be disposed to be spaced apart from one another on the electronic circuit board, have an indication unit exposed to the outside to indicate a current reference value and a trip operation time marked on the case cover, respectively, and be rotatable, respectively.

Each of the setting knobs may include a rotary plate and a central shaft protruded from one surface of the rotary plate in an axial direction.

The indication unit may be protruded from the other surface of the rotary plate in the axial direction.

The indication unit may include a cross recess formed to be concave in a cross shape on one end surface and an indication recess configured as a combination of an arrow-shaped recess or a triangular recess on one end portion of the cross recess.

Each of the setting knobs may have a stoppage protrusion disposed to be spaced apart from one another in the indication unit in a radial direction, and rotatably protruded from an edge of the other surface of the rotary plate.

The case cover may have a plurality of stop protrusions.

The plurality of stop protrusions may be disposed to be spaced apart from one another in an inner surface of the case cover.

The stop protrusion may be protruded to be interfered with by the stoppage protrusion within a rotation range of the stoppage protrusion to limit the rotation range of the stoppage protrusion to a predetermined angle range.

The central shaft of the indication unit has a cross-shaped protrusion structure and rotated so as to be adjusted at a predetermined interval in a circumferential direction.

Any one of the plurality of setting knobs may set a trip operation time such that the trip operation time is adjusted within a range from 0.5 seconds to 500 seconds according to a reference value of a rated current.

Any one of the setting knobs may be a dedicated knob having the stoppage protrusion extending to be longer than those of the other setting knobs in a circumferential direction so as to have a relatively limited rotation angle range.

Any one of the plurality of stop protrusions may extend to be longer than the other stop protrusions in a circumferential direction to relatively limit a rotation angle range of a setting knob corresponding to the extended stop protrusion.

As described above, the overcurrent relay according to an embodiment of the present disclosure employs a dedicated setting knob or a stop protrusion to limit a long-time limit trip operation OFF function, whereby trip operation conditions of an ACB and an MCCB may be set using the same OCR program and PCB.

Also, an OCR program and a PCB may be in common use (or commmonized) and standard authentication details with respect to programs of ACB and MCCB products may be managed collectively.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Description will now be given in detail of the embodiments, with reference to the accompanying drawings. For the sake of brief description with reference to the drawings, the same or equivalent components will be provided with the same reference numbers, and description thereof will not be repeated.

The present disclosure relates to a molded case circuit breaker (MCCB) having an overcurrent relay 110 preventing a trip operation OFF function in case of a long-time limit.

Figure 2:
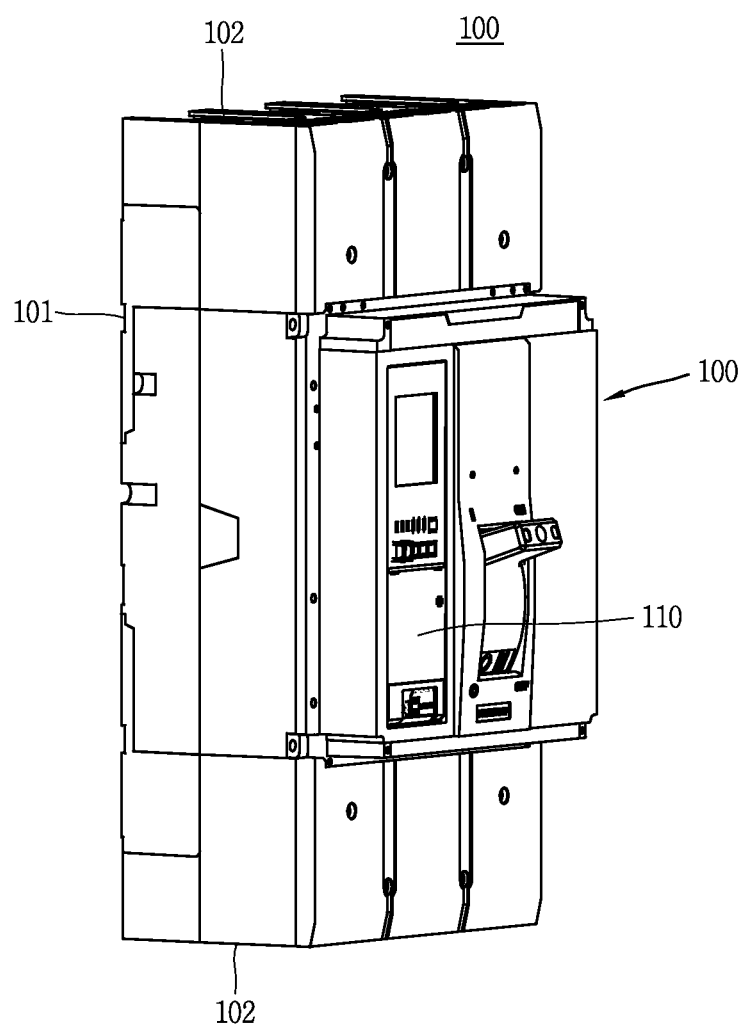
FIG. 2 is a perspective view illustrating a state of an overcurrent relay installed in a molded case circuit breaker (MCCB) according to an embodiment of the present disclosure.

FIG. 2 is a perspective view illustrating a state of an overcurrent relay installed in an MCCB according to an embodiment of the present disclosure.

As illustrated in FIG. 2, the MCCB 100 includes a breaker body 101, a switching mechanism unit 103, an overcurrent relay 110, and a trip mechanism module 119.

The breaker body 101 may include terminal units 102 on both sides thereof.

A power source side external terminal may be insertedly coupled to a terminal 102 provided on one side of the breaker body 101.

A load side external terminal may be insertedly coupled to the terminal unit 102 provided on the other side of the breaker body 101.

The terminal units 102 provided on one side and on the other side may be connected to fixed contacts 121*a* and movable contacts 121*b*, respectively.

The terminal unit 102 may be connected to a 3-phase (R,S,T phases) alternating current (AC) power sources 10.

The switching mechanism unit 103 may switch (or open and close) the contact 121.

The switching mechanism unit 103 may be mechanically connected to the movable contacts 121*b* to bring the movable contacts 121*b* to the fixed contacts 121*a* or separate the movable contacts 121*b* from the fixed contacts 121*a*.

When a fault current is produced, the switching mechanism unit 103 may perform a trip operation.

Figure 3:
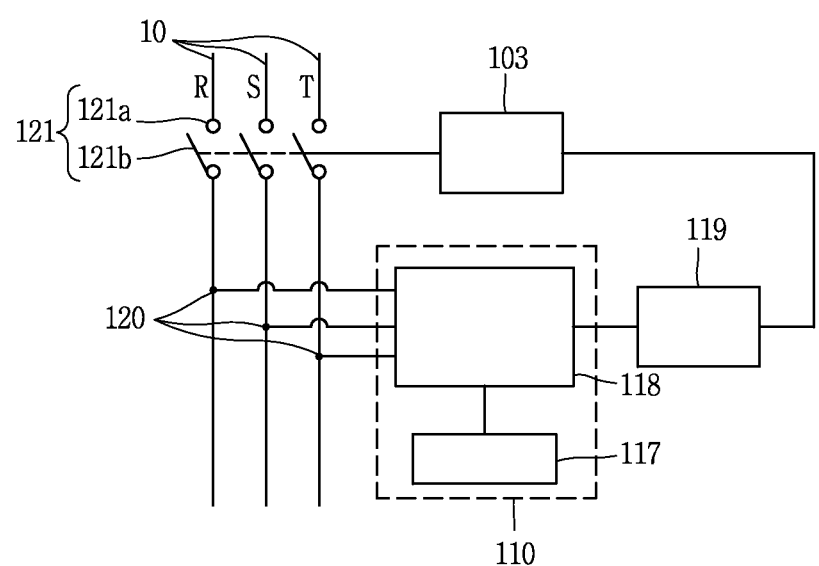
FIG. 3 is a circuit diagram schematically illustrating connection relationships between an overcurrent relay and an MCCB according to an embodiment of the present disclosure.

FIG. 3 is a circuit diagram schematically illustrating connection relationships between an overcurrent relay and an MCCB according to an embodiment of the present disclosure.

The overcurrent relay 110 may include a current sensor 120 and a control unit 118.

The current sensor 120 may be connected to 3-phase terminal units 102 connected to the 3-phase AC power sources 10, respectively.

The current sensor 120 may detect a current signal input to the power source side terminal unit 102.

For example, the current sensor 102 may detect current information that may be compared with a current reference value of a rate current of the circuit breaker 100.

The control unit 118 may be an electronic control unit (ECU) equipped with a microprocessor.

The control unit 118 may be connected to the current sensor 120 and receive a sensing signal from the current sensor 120.

The control unit 118 may include a memory unit. Information such as a current reference value of a rate current and a trip operation time, or the like, may be stored in the memory unit.

A trip operation time may be set by a setting unit 117 (please refer to FIG. 10) of the overcurrent relay 110, and the set trip operation time may be input to the control unit 118.

The control unit 118 may receive a sensing signal from the current sensor 120, compare an input current value with the current reference value based on the rated current, and output a control signal.

When a fault current is produced due to an overload, a short-circuit, a ground fault, and the like, the overcurrent relay 110 may detect the fault current and output a trip command.

The control unit 118 of the overcurrent relay 110 may detect a fault current through the current sensor 120, and output a trip command.

The trip mechanism module 119 may receive a control signal from the control unit 118 and provide driving force to the switching mechanism unit to allow the switching mechanism unit to perform a trip operation.

The trip mechanism module 119 may include an actuator.

The actuator may be a solenoid.

When the overcurrent relay 110 outputs a trip command, the actuator may receive power to become an electromagnet, and generate operating force for performing a trip operation by suction force.

The trip mechanism module 119 may include a trip slider.

The trip slider may be mechanically connected with the actuator.

Connected with the actuator, the trip slider may continuously operate.

The trip slider may move between a closing position and a trip position.

The closing position may be an initial position of the trip slider before the switching mechanism unit 103 performs a trip operation.

The trip operation may be a position to which the trip slider moves to allow the switching mechanism unit 103 to perform a trip operation.

The switching mechanism unit 103 may be mechanically connected the trip mechanism module 119 or the trip slider, and when the trip slider moves to the trip position, the switching mechanism 103 may be perform a trip operation.

According to the trip operation of the switching mechanism unit 103, the movable contact 121 may be separated from the fixed contact 121 to break a fault current.

Figure 4:
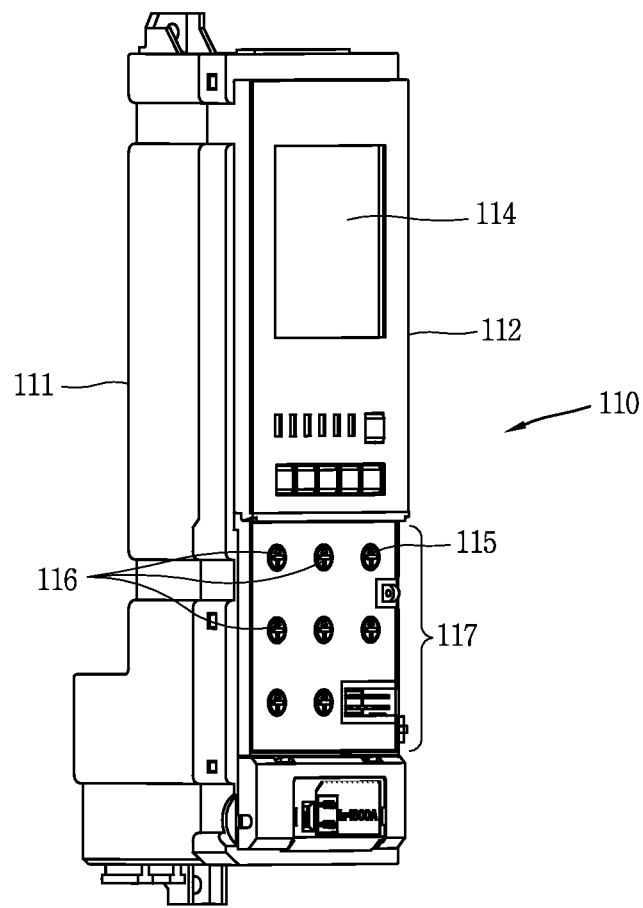
FIG. 4 is a perspective view of an overcurrent relay according to an embodiment of the present disclosure.
Figure 5:
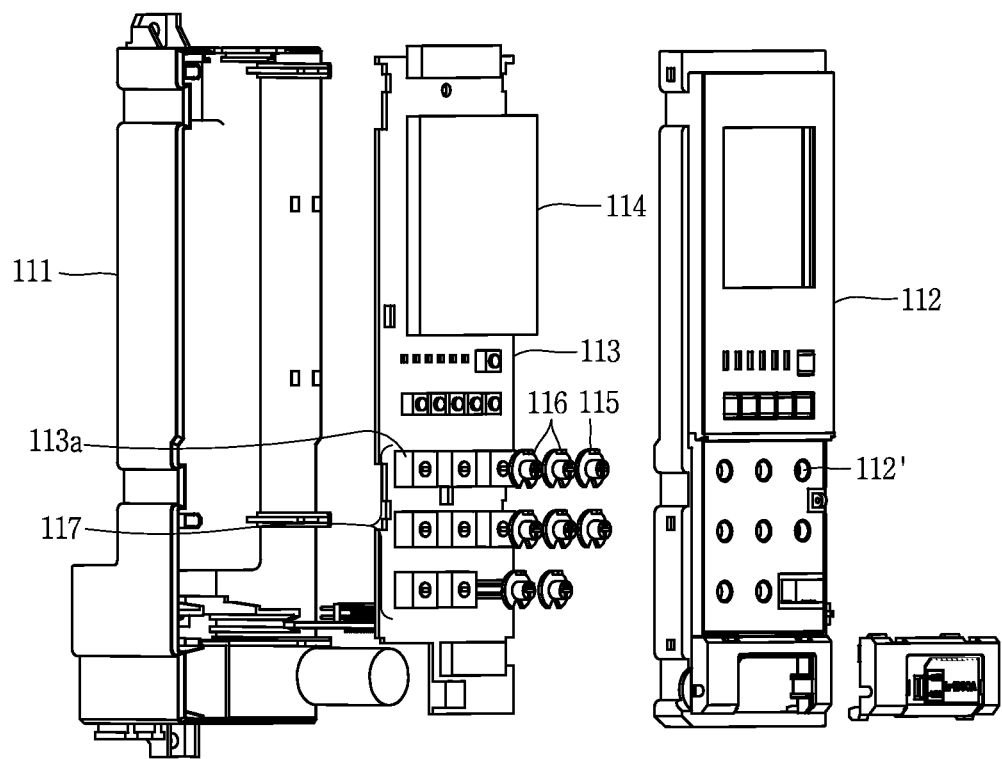
FIG. 5 is an exploded view of the overcurrent relay of FIG. 4 according to an embodiment of the present disclosure.
Figure 6:
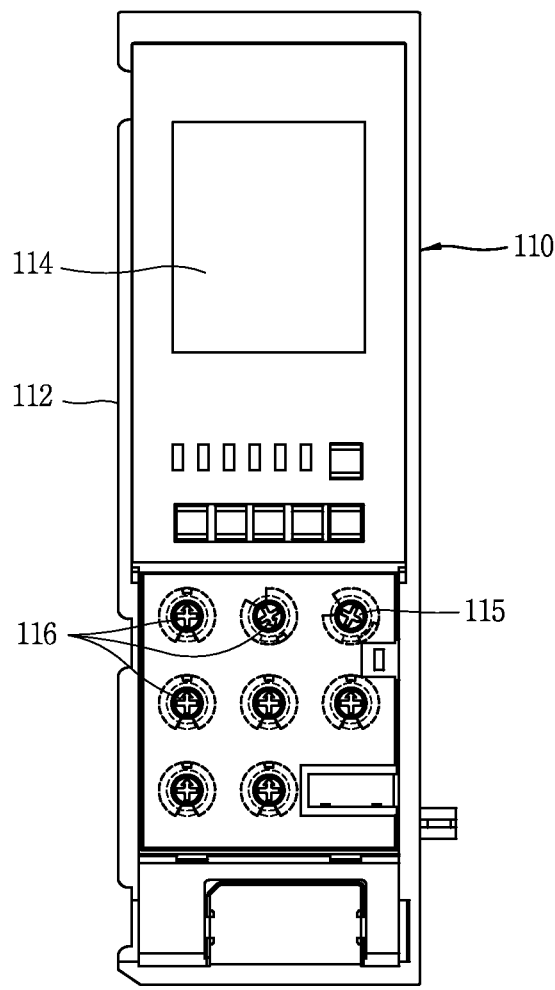
FIG. 6 is a front view of the overcurrent relay of FIG. 4 according to an embodiment of the present disclosure.

FIG. 4 is a perspective view of an overcurrent relay according to an embodiment of the present disclosure, FIG. 5 is an exploded view of the overcurrent relay of FIG. 4 according to an embodiment of the present disclosure, and FIG. 6 is a front view of the overcurrent relay of FIG. 4 according to an embodiment of the present disclosure.

The overcurrent relay 110 may set a trip operation time for a long-time limit through the setting unit 117.

For example, when a current that flows in the contact 121 is within 80% to 100% of a rate current, a trip operation time may be set to a range from 0.5 seconds to 500 seconds.

Figure 10:
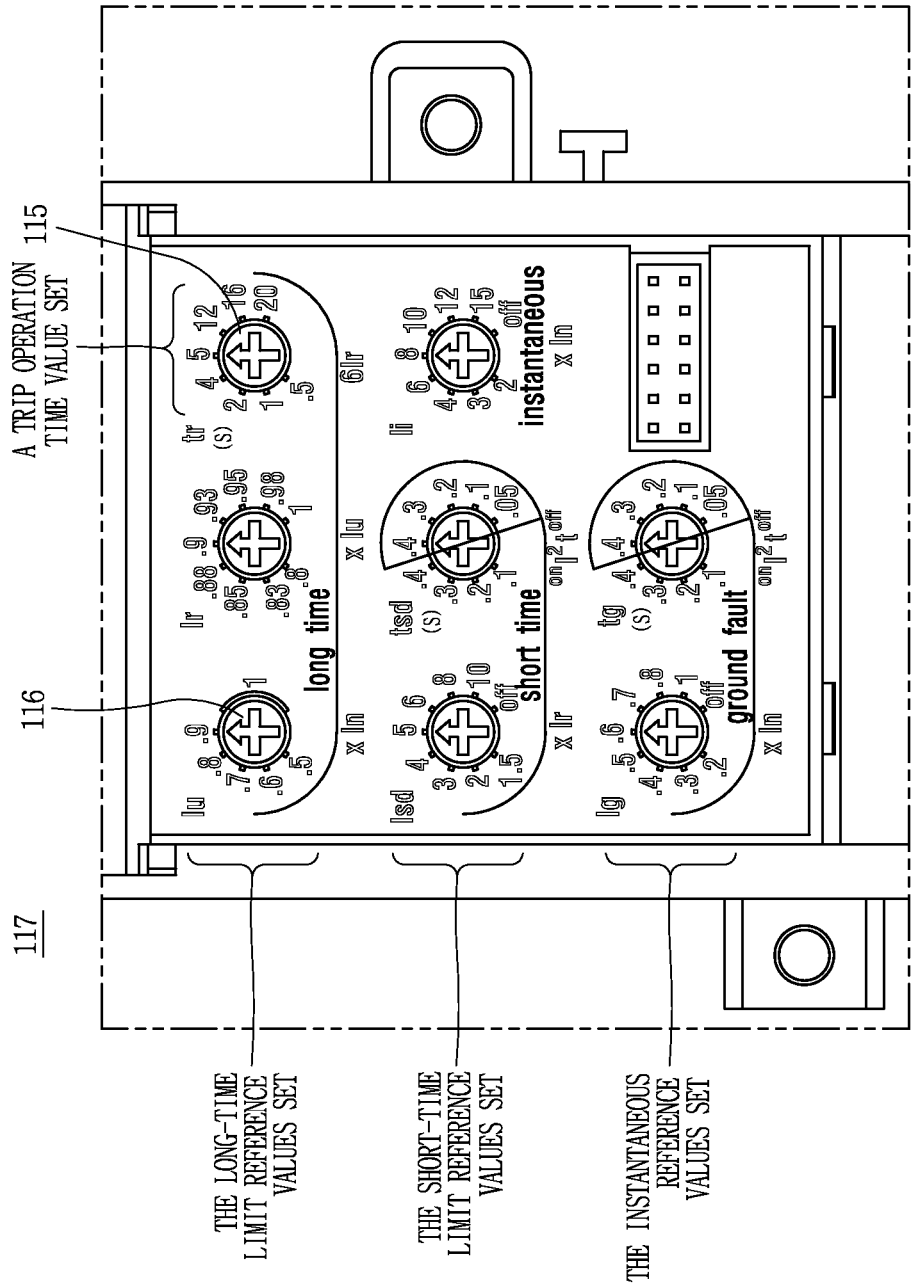
FIG. 10 is a partially enlarged view illustrating a setting unit of an overcurrent relay setting knobs according to an embodiment of the present disclosure.

According to an embodiment, a trip operation time for a long-time limit may be set to range from 0.5 seconds to 20 seconds (please refer to FIG. 10).

The overcurrent relay 110 may be installed to be exposed to a front surface of the MCCB 100.

In the MCCB 100, the trip operation OFF function may be deleted by the setting unit 117 of the overcurrent relay 110 to positively cope with rules of UL standards of the United States.

An outer configuration of the overcurrent relay 110 according to an embodiment of the present disclosure may include a case body 111 and a case cover 112.

The case body 111 may have an inner space for accommodating the electronic circuit board 113.

The case cover 112 may be detachably coupled to the top of the case body 111.

The case cover 112 may be assembled such that the edges thereof is in contact with upper edge portions of the case body 111, so as to be coupled to cover the upper end portion (opening portion) of the case body 111.

The case cover 112 may cover the top of the case body 111 to protect an electronic component, or the like, installed in the case body from external impact.

The case cover 112 may have an opening at one side of a front surface (an upper portion corresponding to about half of the overall length of the cover) of the case cover 112 to expose a display 114.

A sticker on which a long-time limit reference current value and a trip operation time, a short-time limit reference value and a trip operation time, an instantaneous current value, and the like, are printed may be attached to the other side of the front surface of the case cover 112 (please refer to FIG. 10).

For example, the set long-time limit values may include a reference current value that may be set to range from 80% to 100% of a rate current and a trip operation time value that may be set to be within 0.5 seconds to 500 seconds with respect to a current corresponding to the reference current value flows in a circuit.

The set short-time limit values may include a reference current value that may be set to approximately double of the rated current and a trip operation time value that may be set to within 1 second with respect to a current corresponding to the reference current value flows in a circuit.

The overcurrent relay 110 may include the control unit 118 installed in the case body 111.

The control unit 118 may have the electronic circuit board 113.

The display 114 such as an liquid crystal display (LCD), a memory unit, a microprocessor, or the like, may be mounted on the electronic circuit board 113.

The electronic circuit board 113 may be insertedly coupled to a guide recess provided on an inner wall surface of the case body 111 so as to be assembled.

The electronic circuit board 113 is a core component of the digital-type overcurrent relay 110. Multiple electronic components may be mounted on the electronic circuit board 113 to perform various functions such as a function of measuring a current, a voltage, or the like, a complicate interlocking function, a function of closing and opening a circuit breaker or a switch, a function of recording a fault waveform, a function of recording fault contents over time, or the like. The electronic circuit board 113 may also have a communication function, and thus, when a pair of communication cables are connected to the electronic circuit board 113, the electronic circuit board 113 may easily execute the aforementioned functions.

The display 114 may be installed on one side of the electronic circuit board 113 to display trip operation setting, an opening and closing operation of the circuit breaker, a waveform record of a fault current, and the like.

Also, the setting unit 117 may be provided on the other side of the electronic circuit board 113.

Figure 7:
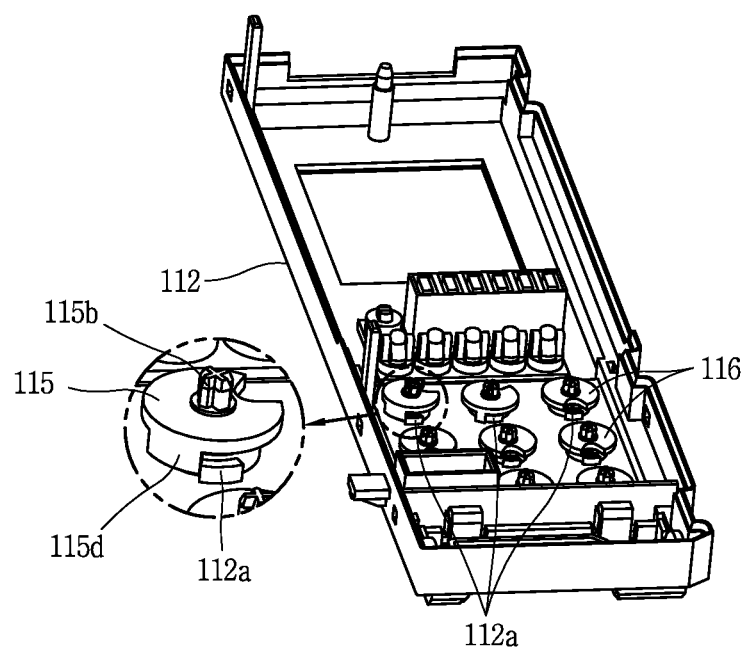
FIG. 7 is an internal perspective view illustrating a state in which setting knobs are installed within a case cover according to a first embodiment of the present disclosure.
Figure 8:
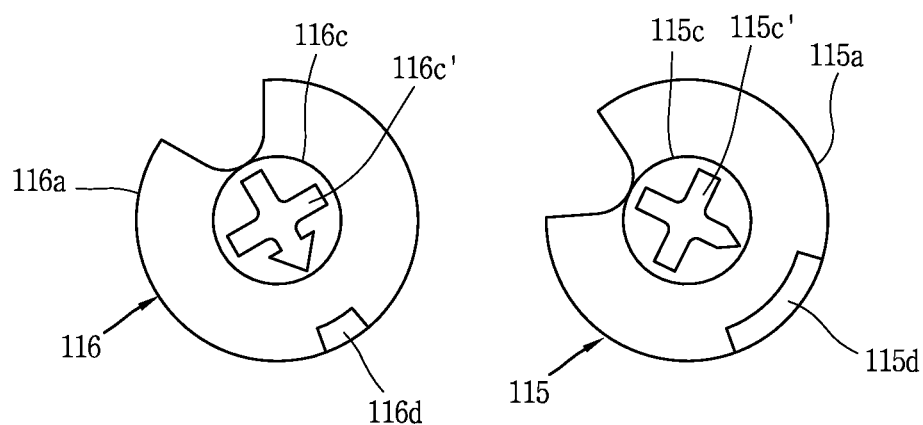
FIG. 8 is a plan view of the setting knobs according to the first embodiment of the present disclosure.
Figure 9:
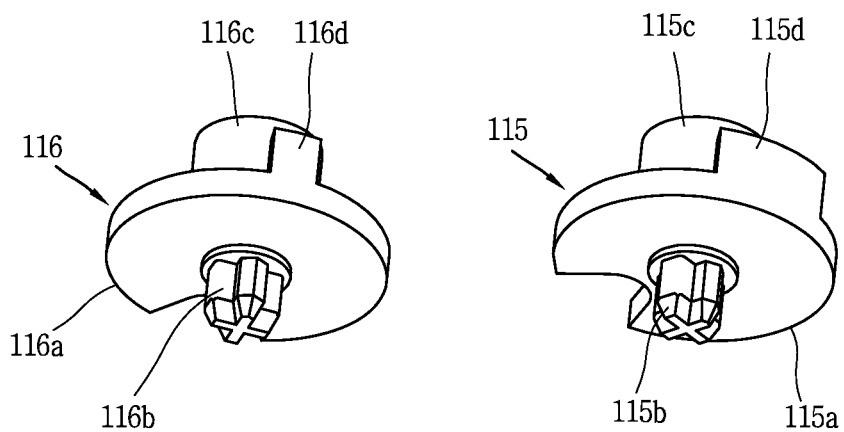
FIG. 9 is a bottom perspective view of the setting knobs according to the first embodiment of the present disclosure.

FIG. 7 is an internal perspective view illustrating a state in which setting knobs are installed within a case cover according to a first embodiment of the present disclosure, FIG. 8 is a plan view of the setting knobs according to the first embodiment of the present disclosure, and FIG. 9 is a bottom perspective view of the setting knobs according to the first embodiment of the present disclosure.

FIG. 10 is a partially enlarged view illustrating a setting unit of an overcurrent relay setting knobs according to an embodiment of the present disclosure.

The setting unit 117 may include a plurality of setting knobs 116.

The setting knobs 116 may be disposed to be spaced apart from one another by a predetermined gap in a traverse direction and a lengthwise direction in the setting unit 117.

The setting knobs 116 may be exposed to the outside through a through hole 112' formed to be spaced apart in a traverse direction and a lengthwise direction on the other side of the case cover 112.

The setting knobs 116 may include eight knobs disposed to be spaced apart from one another in a traverse direction and a lengthwise direction on the other side (facing the setting unit 117) of the case cover 112.

Three setting knobs positioned in the uppermost portion may be used for setting a long-time limit reference current value and a trip operation time value, and three setting knobs 116 positioned in the middle portion may be used to set a short-time limit reference current value and a trip operation time value, and two setting knobs 116 positioned in the lowermost portion may be used to set an instantaneous trip operation.

In this case, the instantaneous trip operation time is defined by circuit breaker standards and not allowed to be arbitrarily set by a user, and thus, a setting knob for setting an instantaneous trip operation time is deleted.

A user may set a reference current value of a rate current (for example, a current value corresponding to 80% to 100% of the rated current) and a trip operation time based on the reference current value by rotating setting knobs 116 and 115 partially exposed to the case cover 112.

The setting knobs 116 may include a disk type rotary plate 116a, a central shaft 116b protruded from the center of one surface (lower surface) of the rotary plate 116a, and an indication unit 116c protruded from the center of the other surface (upper surface) of the rotary plate 116a.

The central shaft 116b may be insertedly coupled to a knob installation portion 113a in a hinged manner to rotatably support the setting knob 116.

The rotary plate 116a may have a disk shape having a predetermined diameter and rotate about the central shaft 116b under the rotary plate 116a.

The indication unit 116c may have a uniform diameter, have a cylindrical shape, and be protruded upwardly. The indication unit 116c may have a cross-shaped indication recess 116c' in an upper end of the indication unit 116c.

The indication recess 116c' may have a combination of a cross recess formed to be concave in a cross shape and an arrow or a triangular recess formed in one end portion of the cross recess.

By applying the cross recess with one end portion having a triangular shape to the setting knob 116, the user may rotate the setting knob 116 using a screwdriver, or the like, and set a trip operation time, or the like, according to a rotation angle indicated by the arrow or the triangular vertex.

The indication unit 116c of the setting knob 116 may be exposed to the outside of the case cover 112 through a through hole 112', and the user may rotate the cross recess of the indication unit 116c to adjust the same within a predetermined rotation angle range.

Also, the setting knob 116 may be rotated to be adjusted at a predetermined space in a circumferential direction by the cross protrusion structure provided on an outer surface of the central shaft 116b.

The cross protrusion structure may include a sharp portion formed on an outer surface of the central shaft 116b and having a cross-sectional area narrowed outwardly in a radial direction.

The electronic circuit board 113 may be disposed to be spaced apart from the setting unit 117 and include a plurality of knob installation portions 113a rotatably supporting the setting knobs 116.

The knob installation portion 113a may include a stop recess disposed to be spaced apart from one another in a circumferential direction on an inner surface to cover the central axis 116b. As the cross protrusion (the sharp portion) of the setting knob 116 is caught by the stop recess, the setting knob 116 may be adjusted at a predetermined interval in the circumferential direction.

The reason for adjusting the setting knob 116 at a predetermined interval in the circumferential direction is to allow the indication recess 116c (the arrow or the triangular vertex) formed in the indication unit 116c of the setting knob 116 to accurately indicate a set value (a trip operation time, or the like) shown at intervals in the circumferential direction at an outer side of the case cover 112.

The setting knob 116 may be rotatably supported in place by a support unit.

Also, an operable rotation angle range of the setting knob 116 may be limited to a predetermined range by a stoppage protrusion 116d.

The stoppage protrusion 116d may be protruded continuously by a predetermined section in the circumferential direction on the edge of the rotary plate 116a of the setting knob 116.

The stoppage protrusion 116d is spaced apart from the indication unit 116c of the rotary plate 116a outwardly in a radial direction and protruded by a predetermined curvature so as to be operated as a one body together with the rotary plate 116a.

The case cover 112 may have a plurality of stop protrusions 112a disposed to be spaced apart from one another on an inner surface thereof.

Each stop protrusion 112a is protruded from the inner surface of the case cover 112 toward the electronic circuit board 113, and in this case, the stop protrusion 112a may be protruded within a rotation radius of the stoppage protrusions 116d and 115d so as to be interfered with by the stop protrusion 112a and stopped.

According to such a structure, one lateral portion of the stoppage protrusion 115d may be in contact with one lateral portion of the stop protrusion 112a at a point at which the setting knob 116 starts to be rotated, and the other lateral portion of the stoppage protrusion 116d may be in contact with the other lateral portion of the stop protrusion 112a at a point at which rotation of the setting knob 116 is completed.

Accordingly, when the setting knob 116 is rotated in a clockwise direction at the rotation starting point, the setting knob 116 is stopped by the stop protrusion 112a, and thus, a maximally rotatable range is limited.

For example, referring to a rotational operation and a rotation angle range of the setting knob 116, the setting knob 116 may start to rotate at an approximately 7 o'clock as a rotation start point based on an hour hand of an analog clock and the rotation of the setting knob 116 may be terminated at approximately 5 o'clock as a rotation complete point.

Hereinafter, differences between the setting knob 116 according to an embodiment of the present disclosure and the existing setting knob 116 will be described in detail.

In the prior art, the setting knob 116 for setting a long-time limit trip operation time has a rotation angle range identical to those of other setting knobs 116.

Figure 1:
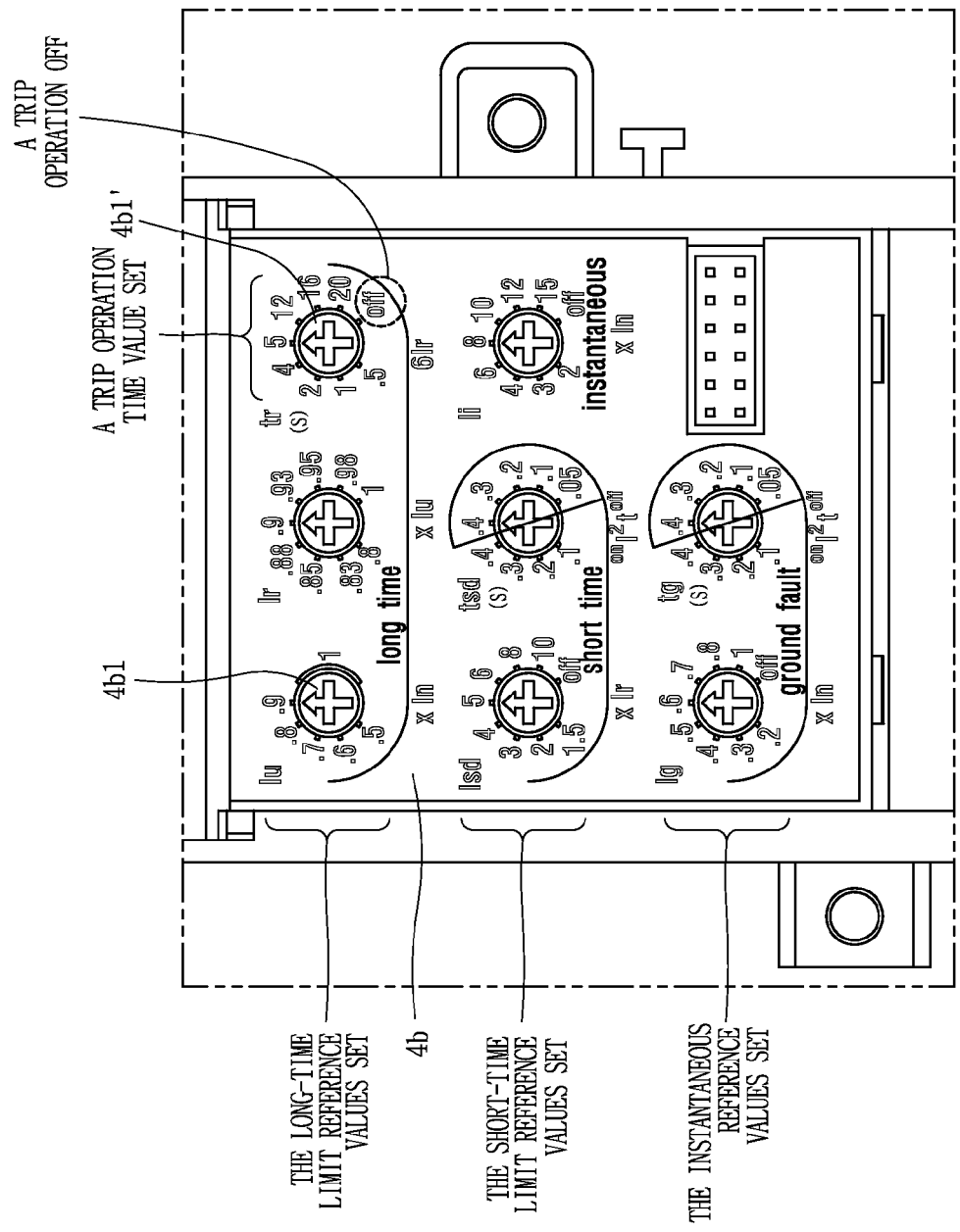
FIG. 1 is a partially enlarged view of a setting unit of an overcurrent relay in the prior art air circuit breaker (ACB)

For example, when the existing setting knob 116 for setting a trip operation time is rotated to an OFF position indicated at the end of the marked scale (0.5 to 20 seconds) for setting a long-time limit trip operation time, the setting knob 116 may perform a trip operation OFF function such that a trip operation may not be performed (please refer to FIG. 1).

However, in an embodiment of the present disclosure, a dedicated knob 115 may be provided to prevent a long-time limit trip OFF function.

The dedicated knob 115 may be any one of the setting knobs 116 described above.

The dedicated knob 115 may have a rotation angle range narrower than those of other setting knobs 116, thus preventing a trip operation OFF function.

For example, the other setting knobs 116 may have a rotation range ranging from a maximum of 300 degrees to 340 degrees based on a certain rotation start point, while the dedicated knob 115 may have a rotation range ranging from a maximum of 270 degrees to 300 degrees starting from the same rotation start point.

Referring to an hour hand of an analog clock, other setting knobs 116 are rotatable up to 5 o'clock based on 5 o'clock, the same start point, while the dedicated knob 115 may rotate up to 3 to 4 o'clock.

A trip operation time interval of the dedicated knob 115 may be set according to predetermined time intervals between 0.5 seconds and 20 seconds from a start point to an end point (please refer to FIG. 10).

In order to reduce a maximal rotation available range of the dedicated knob 115 according to a first embodiment of the present disclosure, the stoppage protrusion 115d of the dedicated knob 115 may extend in the circumferential direction.

According to the first embodiment, the stop protrusion 112a corresponding to the dedicated knob 115 may have a shape, structure, and size identical to those of other stop protrusions 112a.

However, since the length of the stoppage protrusion 115d provided on the rotary plate 115a of the dedicated knob 115 in the circumferential direction is longer than the stoppage protrusion 116d provided on the rotary plate 116a of each of other setting knobs 116 in the circumferential direction, a rotation angle range of the dedicated knob 115 may be relatively reduced, compared to the other setting knobs 116.

According to the following equation, as the length of the stoppage protrusions 116d and 115d provided on the rotary plates 116a and 115a in the circumferential direction is increased, a rotatable angle ($\alpha$) range of the setting knob 116 and the dedicated knob 115 may be reduced.

$$\alpha = 360° - \frac{a}{2\pi r} \times 360°$$

Here, $\alpha$ is a rotation angle of a knob, a is a length of the stoppage protrusions 116d and 115d in a circumferential direction, and r is a rotation radius of the stoppage protrusions 116d and 115d.

The rotation radius (r) of the stoppage protrusions 116d and 115d may be constant, and the rotation angle ($\alpha$) of the setting knobs 116 and 115 may vary according to a length of the stoppage protrusions 116d and 115d in the circumferential direction.

The rotation radius of the stoppage protrusions 115d and 115d may be a distance from the center of the rotary plates 116a and 115a to a central line of a thickness of the stoppage protrusions 116d and 115d in a radial direction.

According to the stoppage structure of the rotary plates 116a and 115a, the setting knob 116 may rotate within an angle range of 320 degrees from a rotation start point (0°) to a rotation end point (320°), for example, and a trip operation time, or the like, may be set according to the set values (marked scale) marked on the outer surface of the case cover 112 within the rotation range.

A trip operation OFF function prevents the circuit breaker 100 from performing a trip operation (automatic breaking) even though a current value that flows in a circuit is equal to or greater than a pre-set reference current value.

However, in UL standards of the US prohibits such a trip operation OFF function in the MCCB 100. Thus, by applying the dedicated knob 115 to the overcurrent relay 110 of the MCCB 100, the present disclosure may positively cope with the UL standards.

Figure 11:
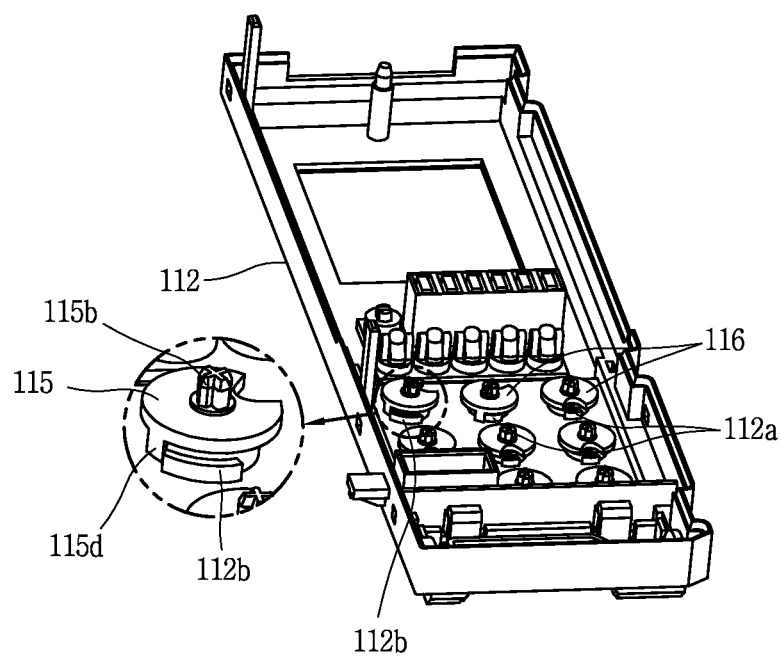
FIG. 11 is an internal perspective view illustrating a state in which setting knobs are installed within a case cover setting knobs according to a second embodiment of the present disclosure.

FIG. 11 is an internal perspective view illustrating a state in which setting knobs are installed within a case cover setting knobs according to a second embodiment of the present disclosure.

An overcurrent relay 110 according to the second embodiment of the present disclosure may provide a dedicated stop protrusion 112b for preventing a trip operation OFF function.

The dedicated stop protrusion 112b may be any one of a plurality of stop protrusions provided within a case cover 112.

The dedicated stop protrusion 112b may be applied to correspond to the dedicated knob 115 positioned in the uppermost portion at the right among eight setting knobs 116 when the electronic circuit board is viewed from the front side.

The dedicated stop protrusion 112b may further extend, relative to the lengths of the other stop protrusions 112a, among the plurality of stop protrusions 112a, in the circumferential direction.

Among the setting knobs 116, the dedicated knob 115 for setting a long-time limit trip operation time may have a stop protrusions 115d on the rotary plate 115a, and the stop protrusions 115d may be caught by the dedicated stop protrusion 112b.

Accordingly, since a rotation angle range of the setting knob 115 for setting the long-time limit trip operation time is limited to be narrower than those of the other setting knobs 116, the long-time limit trip operation OFF function may be deleted.

According to the first and second embodiments of the present disclosure, the dedicated knob 115 for setting a long-time limit trip operation time may be prevented from being rotated to a trip operation OFF position.

Also, existing "trip operation OFF" may be deleted from a sticker attached to the case cover 112 illustrated in FIG. 10.

Thus, according to embodiments of the present disclosure, since a rotation angle of the dedicated knob 115 for setting a long-time limit trip operation time in the circumferential direction is limited, the dedicated knob 115 cannot be rotated to the trip operation OFF position, satisfying the UL standards of the US.

Also, trip operation conditions of an ACB and an MCCB may be set or functions thereof may be altered by modifying the same program and a PCB, and standard authentication details managements with respect to a program may be unified.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An overcurrent relay comprising:
a case cover including a plurality of stop protrusions on an inner surface thereof and coupled to the case body;
an electronic circuit board installed within the case body; and
a plurality of setting knobs rotatably installed on the electronic circuit board, having a stoppage protrusion on a rotary plate, operated within a predetermined rotation range upon being caught by the stoppage protrusion, and setting a trip operation time with respect to a fault current,
wherein one of the setting knobs is a dedicated knob configure to prevent a long-time limit trip OFF function, and
wherein the dedicated knob includes a stoppage protrusion extending to be longer than the stoppage protrusion of the other setting knobs in a circumferential direction so as to have a rotation angle range narrower than those of other setting knobs.

2. The overcurrent relay of claim 1, wherein the dedicated knob is used to set a long-time limit trip operation time, among a long-time limit trip operation time, a short-time limit trip operation time, and an instantaneous trip operation time.

3. An overcurrent relay comprising:
a case cover including a plurality of stop protrusions on an inner surface thereof and coupled to the case body;
an electronic circuit board installed within the case body; and
a plurality of setting knobs rotatably installed on the electronic circuit board, having a stoppage protrusion on a rotary plate, operated within a predetermined rotation range upon being caught by the stoppage protrusion, and setting a trip operation time with respect to a fault current,
wherein one of the setting knobs is a dedicated knob configure to prevent a long-time limit trip OFF function,
wherein one of the plurality of stop protrusions is a dedicated stop protrusion configure to prevent a long-time trip OFF function, and
when the dedicated stop protrusion extends to be longer than the other stop protrusions in a circumferential direction such that the dedicated knob has a rotation angle range narrower than those of other setting knobs.

4. A molded case circuit breaker (MCCB) comprising:
a switching mechanism unit configured to open and close a contact;
an overcurrent relay configured to detect fault current generated in a main circuit and output a trip command;
a trip mechanism module mechanically connected to the switching mechanism unit and generate operating force for a trip operation of the switching mechanism unit when the overcurrent relay outputs a trip command,
wherein the overcurrent relay comprises:
a case body;
a case cover coupled to the case body;
a control unit installed within the case body and having an electronic circuit board; and
a plurality of setting knobs disposed to be spaced apart from one another on the electronic circuit board, having an indication unit exposed to the outside to indicate a current reference value and a trip operation time marked on the case cover, respectively, and configured to be rotatable, respectively,
wherein each of the setting knobs includes:
a rotary plate and a central shaft protruded from one surface of the rotary plate in an axial direction; and
a stoppage protrusion disposed to be spaced apart from one another in the indication unit in a radial direction, and rotatably protruded from an edge of the other surface of the rotary plate,
wherein the indication unit is protruded from the other surface of the rotary plate in the axial direction, and includes a cross recess formed to be concave in a cross shape on one end surface and an indication recess configured as a combination of an arrow-shaped recess or a triangular recess on one end portion of the cross recess,
wherein one of the setting knobs is a dedicated knob configure to prevent a long-time limit trip OFF function, and
wherein the dedicated knob includes a stoppage protrusion extending to be longer than the stoppage protrusion of the other setting knobs in a circumferential direction so as to have a rotation angle range narrower than those of other setting knobs.

5. The molded case circuit breaker of claim 4, wherein the central shaft of the indication unit has a cross-shaped protrusion structure and rotated so as to be adjusted at a predetermined interval in a circumferential direction.

6. The molded case circuit breaker of claim 5, wherein any one of the plurality of setting knobs sets a trip operation time such that the trip operation time is adjusted within a range from 0.5 seconds to 500 seconds according to a reference value of a rated current.

* * * * *